(12) United States Patent
Deguchi et al.

(10) Patent No.: US 7,626,915 B2
(45) Date of Patent: Dec. 1, 2009

(54) PHASE-CHANGE OPTICAL RECORDING MEDIUM AND RECORDING AND REPRODUCING METHOD THEREOF

(75) Inventors: Hiroshi Deguchi, Yokohama (JP); Kazunori Ito, Yokohama (JP); Eiko Hibino, Yokohama (JP); Hiroko Ohkura, Yokohama (JP); Masaki Kato, Sagamihara (JP); Mikiko Abe, Kawasaki (JP); Hiroyoshi Sekiguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 559 days.

(21) Appl. No.: 11/302,276

(22) Filed: Dec. 14, 2005

(65) Prior Publication Data
US 2006/0153053 A1 Jul. 13, 2006

(30) Foreign Application Priority Data
Dec. 15, 2004 (JP) .............................. 2004-363599

(51) Int. Cl.
*G11B 7/24* (2006.01)
(52) U.S. Cl. .................................. 369/275.1
(58) Field of Classification Search ........... 369/275.1–4
See application file for complete search history.

(56) References Cited

U.S. PATENT DOCUMENTS

| | | | |
|---|---|---|---|
| 5,051,340 A * | 9/1991 | Tyan et al. | ................... 430/321 |
| 5,840,466 A | 11/1998 | Nonaka et al. | |
| 6,096,398 A | 8/2000 | Yuzurihara et al. | |
| 6,177,167 B1 | 1/2001 | Yuzurihara et al. | |
| 6,391,417 B1 | 5/2002 | Yuzurihara et al. | |
| 6,426,936 B1 | 7/2002 | Shinotsuka et al. | |
| 6,741,545 B2 | 5/2004 | Shinotsuka et al. | |
| 6,770,346 B2 | 8/2004 | Harigaya et al. | |
| 6,841,049 B2 | 1/2005 | Ito et al. | |
| 2002/0110063 A1 * | 8/2002 | Yamada et al. | ........... 369/47.39 |
| 2004/0017768 A1 | 1/2004 | Hibino et al. | |
| 2004/0076099 A1 | 4/2004 | Yuzurihara et al. | |
| 2004/0105952 A1 | 6/2004 | Deguchi et al. | |
| 2004/0141447 A1 | 7/2004 | Yuzurihara et al. | |
| 2004/0161700 A1 | 8/2004 | Abe et al. | |
| 2004/0262149 A1 | 12/2004 | Ito et al. | |
| 2005/0078587 A1 | 4/2005 | Narumi et al. | |
| 2005/0082162 A1 * | 4/2005 | Uno et al. | .............. 204/192.26 |
| 2006/0077884 A1 | 4/2006 | Ohkura et al. | |

FOREIGN PATENT DOCUMENTS

| | | |
|---|---|---|
| EP | 1 598 818 A1 | 11/2005 |
| JP | 4-286683 | 10/1992 |
| JP | 6-103609 | 4/1994 |

(Continued)

*Primary Examiner*—Hoa T Nguyen
*Assistant Examiner*—Andrew J Sasinowski
(74) *Attorney, Agent, or Firm*—Oblon, Spivak, McClelland, Maier & Neustadt, L.L.P.

(57) ABSTRACT

The phase-change optical recording medium having a substrate, and at least a first protective layer, a recording layer composed of a phase-change material, a second protective layer and a reflective layer disposed on the substrate in this sequence has a maximum recording linear velocity $V_H$ of 20 m/s to 60 m/s, a range of linear velocity recordable even when the recording linear velocity is continuously changed of $0.3V_H$ to $1.0V_H$, and no occurrence of crystals causing a reproduction error in recorded marks.

9 Claims, 5 Drawing Sheets

FOREIGN PATENT DOCUMENTS

| | | |
|---|---|---|
| JP | 8-17072 | 1/1996 |
| JP | 3474714 | 9/2003 |
| JP | 2004-164849 | 6/2004 |
| JP | 2004-164850 | 6/2004 |
| JP | 2004-203011 | 7/2004 |
| JP | 2004-224040 | 8/2004 |
| JP | 2004-224041 | 8/2004 |
| JP | 2004-255889 | 9/2004 |
| JP | 2004-259443 | 9/2004 |
| JP | 2004-322630 | 11/2004 |
| JP | 2004322640 | * 11/2004 |
| JP | 2005-145061 | 6/2005 |
| JP | 2005-153338 | 6/2005 |
| WO | WO 2005/051672 A1 | 6/2005 |
| WO | WO 2006/028251 A1 | 3/2006 |

* cited by examiner

PHASE-CHANGE OPTICAL RECORDING MEDIUM AND RECORDING AND REPRODUCING METHOD THEREOF

BACKGROUND OF THE INVENTION

1. Field of the Invention

The present invention relates to a phase-change optical recording medium (hereinafter may be referred to as "optical recording medium") and recording and reproducing method of the phase-change optical recording medium in which crystallization in recorded mark is suppressed.

2. Description of the Related Art

In late years, there has been an increase in development of phase-change optical recording media in which phase-change materials are used as protective layers. The phase-change optical recording media which are in practical use are mainly the phase-change optical discs.

In a phase-change optical disc in general, a specified groove is formed on a transparent plastic substrate and a thin film is formed on the substrate. The plastic material used for substrate is mainly a polycarbonate and injection molding is often used for groove formation. The thin film formed on the substrate is a multilayer film and it is basically composed of first protective layer, recording layer, second protective layer and reflective layer in this sequence from the substrate.

For the first and second protective layers, oxides, nitrides and sulfides are generally used and among them, ZnS—$SiO_2$, a mixture of ZnS and $SiO_2$ is commonly used.

For the recording layer, a phase-change material containing SbTe as main element is often used. In particular, examples include Ge—Sb—Te, In—Sb—Te, Ag—In—Sb—Te, Ge—In—Sb—Te and Ge—Sn—Sb—Te and other than these, Ge—Te, In—Sb, Ga—Sb and Ge—Sb are also used.

Metal materials are used for the reflective layer and metal materials such as Al, Ag, Au and Cu and alloys thereof are preferably used for their appropriate optical properties and heat conductivity. In addition, different layers are formed or a multilayer is formed for each layer to have so-called "insert layer" or "interface layer" between above-mentioned each layer for the purpose of improving various disc properties.

Various film-forming techniques such as resistance line heating, electrical beam vapor deposition, sputtering, CVD, and the like may be used for the formation of these multilayer and among them, sputtering is often used for its excellent productivity. A resin layer is coated by spin coating after formation of these layers for the protection of thin film.

In the resultant phase-change optical discs, the phase-change material used for the recording layer is in an amorphous condition and it is generally initialized for crystallization.

The initialization of above-produced phase-change optical discs is usually conducted by irradiating a laser beam from a semiconductor laser having a width of several micrometers and a length of several dozen to several hundred micrometers while rotating the disc and moving the laser beam in radius direction. The laser beam irradiation is often equipped with a focusing function for more effective irradiation.

In the phase-change optical disc produced above, it is possible to form a desired amorphous mark (hereinafter may be referred to as "recorded mark") by irradiating an optionally determined laser emission pattern (hereinafter may be referred to as "recording strategy"). Moreover, a direct overwrite (DOW), in which erasing and recording are performed simultaneously, is possible in the phase-change optical disc.

In "erasing", amorphous mark is recrystallized and in "recording", an amorphous mark is formed from crystal condition.

One of often used recording strategies is a three-value control (Pw>Pe>Pb), which include recording power (Pw), erasing power (Pe) and bias power (Pb). A specified mark length is recorded by combining these and various pulse width. The mark length control is extremely important because EFM modulation used in CD or EFM+ modulation used in DVD as a modulation method for data recording and reproducing is a mark edge recording method. In general, jitter property is used for evaluation of the mark length control.

Such phase-change optical discs are applied to CD-RW, DVD+RW, DVD-RW, DVD-RAM, HD-DVD, Blue-Ray Disc, etc. and are widely spread for audio visual application and information recording application of computers.

In recent years, improvement of recording speed of these optical discs is hoped owning to larger amount of digital capacity. For high-speed recording of the phase-change optical discs, rewrite functions at higher recording linear velocity in a wider range of recording linear velocity are required. The higher recording linear velocity corresponds to the maximum recording linear velocity and a wider range of recording linear velocity corresponds to a recordable range of linear velocity. These will be explained below.

When two recording methods, CAV recording in which a recording is performed at a constant recording rotational frequency and CLV recording in which a recording is performed at a constant linear velocity are considered, CAV recording is more preferable. In CLV recording, a rotational frequency changes depending on a radius value and higher rotational frequency is required near inner periphery.

Therefore, the maximum linear velocity at the innermost periphery is determined by the rolling capacity limit of a recording/reproducing apparatus for optical disc. When CAV recording is employed, it becomes possible to perform a recording at a linear velocity higher than above limit by performing a recording faster at outer periphery than at innermost periphery.

For example, if the rotational frequency limit of a recording/reproducing apparatus for optical disc is 10,000 rpm, linear velocity is approximately 25 m/s at 24 mm radius and this corresponds to approximately 7 double speeds when standardized with DVD standard linear velocity of 3.5 m/s. When recording at a linear velocity higher than this, it is necessary to perform CAV recording in a determined radius range or in the entire surface of a disc. Or, it is necessary to perform ZCLV recording in which multiple recording linear velocities corresponding to radius value of a disc are employed.

Since data transfer speed itself commensurate with recording linear velocity, it is necessary to perform CAV recording for recording at a linear velocity higher than the rotational frequency limit of a recording/reproducing apparatus for optical disc. Therefore, rewrite function at a determined range of recording linear velocity is also required as well as improving the maximum linear velocity for obtaining better recording linear velocity.

In addition, when CAV recording is performed in CD or DVD, since disc size is 120 mm in diameter, the ratio of recording linear velocity at outermost periphery to recording linear velocity at innermost periphery (recording linear velocity at outermost periphery/recording linear velocity at innermost periphery) calculated is approximately 2.4. For a 4 double-speed disc of DVD+RW, the range of recording linear velocity required for CAV recording is 5.8 m/s to 14.0 m/s. "4 double-speed" in here means the linear velocity is 4 times the standard linear velocity of DVD, 3.5 m/s.

On the other hand, as the maximum recording linear velocity increases, the range of recording linear velocity also increases by necessity. As mentioned above, it turns out that the recording linear velocity ranges from 5.8 m/s to 14.0 m/s (range width of 8.2 m/s) for 4 double-speed discs while the recording linear velocity ranges from 11.5 m/s to 28.0 m/s (range width of 16.5 m/s) for 8 double-speed discs. Therefore, it is necessary to widen the range of recording linear velocity as well as to increase the maximum recording linear velocity for improving the recording linear velocity of CAV or ZCLV recording.

It has been discussed that the need for CAV or ZCLV recording comes from the rotational frequency limit of an optical disc in a recording/reproducing apparatus for optical disc. The CAV recording is also a significant technique for speeding up of a random access recording because rotational frequency is constant in CAV recording and there is no need to adjust the rotational frequency depending on a radius value for recording. Speeding up of a random access recording equals to speeding up of a data transfer and it also leads to the improvement of recording speed actually felt by users consequently.

The related arts regarding the high-speed recording and CAV recording described above can be found in Japanese Patent Application Laid-Open (JP-A) Nos. 2004-203011, 2004-164850, 2004-164849, 04-286683, 06-103609 and Japanese Patent (JP-B) No. 3474714, for example.

For example, an optical recording medium using phase-change materials based on InSb (Technical Digest ISOM '04 p.266 "In—Sb Phase-Change Material for 16× DVD-Rewritable Media"), SnSb (JP-A No. 2004-203011), and the like is proposed as phase-change recording materials capable of high-speed recording. However, both proposals only refer to high-speed recording and there is no description for the range of recording linear velocity required for CAV recording. In addition, with reference to the optical recording medium using phase-change materials based on GaSb, GeSb (JP-A No. 2004-224040, No. 2004-224041 and No. 2004-322630), BiGeTe (JP-A No. 2004-259443 and No. 2004-255889), and the like, high-speed recording and CAV recording are described.

SUMMARY OF THE INVENTION

The object of the present invention is to provide a phase-change optical recording medium and recording and reproducing method of the phase-change optical recording medium capable of suppressing crystallization of recorded marks, performing a recording of high linear velocity, and pursuing appropriate PI error and jitter properties simultaneously in a wide range of linear velocity.

After a dedicated investigation conducted by the present inventors to settle above issues, a new issue conventionally unknown has emerged during a development of high-speed recording disc based on CAV recording required for high-speed recording. It was found that "a phenomenon in which reproduction error increases in the range of recording linear velocity with a practical level of jitter property" occurs in some occasions and there is a means to resolve the problem. The "reproduction error" in here describes a degree of assurance when a recorded data is converted to a digital data. It is better when the value of the reproduction error is low.

When jitter property is in a right range, reproduction error is low, and this has been a consistent phenomenon in the past. Only when a disc was having a lot of defects, there has been a rare case where jitter and reproduction error properties contradict each other.

However, it was confirmed that the phenomenon the present inventors have found was not caused by defects.

The present invention is based on the knowledge of the present inventors and means for solving above-mentioned problems is as follow.

The first embodiment of the phase-change optical recording medium according to the present invention contains a substrate and at least a recording layer composed of a phase-change material disposed on the substrate.

The first embodiment of the phase-change optical recording medium has a maximum recording linear velocity $V_H$ of 20 m/s to 60 m/s, a range of linear velocity recordable even when the recording linear velocity is continuously changed of $0.3V_H$ to $1.0V_H$ and no crystals causing a reproduction error in recorded marks.

The second embodiment of the phase-change optical recording medium according to the present invention contains a substrate and at least a recording layer composed of a phase-change material on the substrate.

The second embodiment of the phase-change optical recording medium has a maximum recording linear velocity $V_H$ of 20 m/s to 60 m/s, a range of linear velocity recordable even when the recording linear velocity is continuously changed of $0.3V_H$ to $1.0V_H$, jitter of less than 12% and reproduction error of 350 or less when 10 repeated recordings are performed.

The first embodiment of the recording and reproducing method of the phase-change optical recording medium according to the present invention contains amorphousizing of a recording layer for recording of information and crystallizing of the recording layer for erasing of information by irradiating the phase-change optical recording medium having at least the recording layer with a laser beam.

The first embodiment of the recording and reproducing method of the phase-change optical recording medium has a maximum recording linear velocity $V_H$ of 20 m/s to 60 m/s, a range of linear velocity recordable even when the recording linear velocity is continuously changed of $0.3V_H$ to $1.0V_H$ and no occurrence of crystals causing a reproduction error in recorded marks.

The second embodiment of the recording and reproducing method of the phase-change optical recording medium according to the present invention contains amorphousizing of a recording layer for recording of information and crystallizing of the recording layer for erasing of information by irradiating the phase-change optical recording medium having at least the recording layer with a laser beam.

The second embodiment of the recording and reproducing method of the phase-change optical recording medium has a maximum recording linear velocity $V_H$ of 20 m/s to 60 m/s, a range of linear velocity recordable even when the recording linear velocity is continuously changed of $0.3V_H$ to $1.0V_H$, jitter of less than 12% and reproduction error of 350 or less when 10 repeated recordings are performed.

Figure 1:
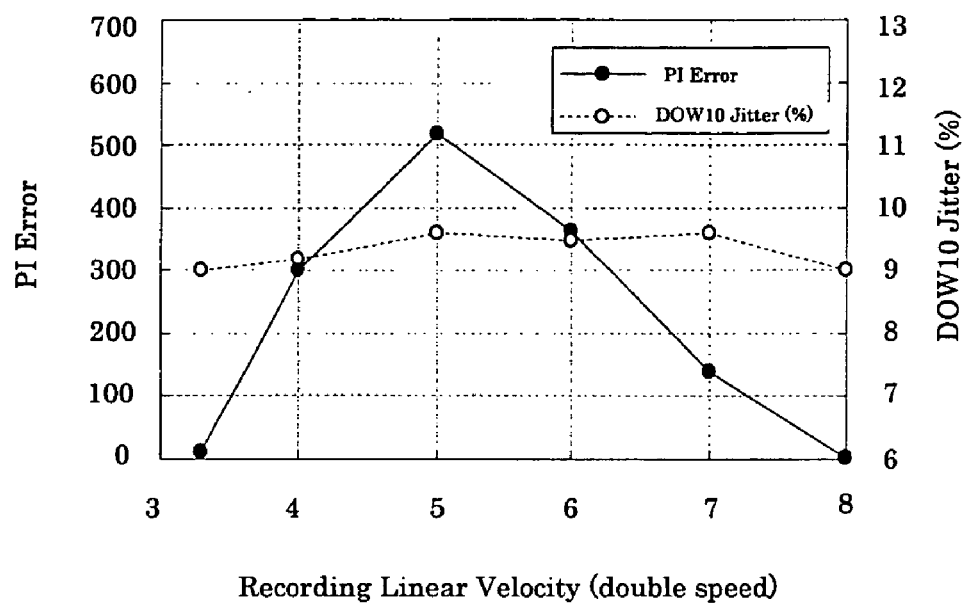
FIG. 1 is a graph showing a relation between the recording linear velocity of a phase-change optical disc developed for 8 double-speed recording of DVD+RW and jitter and PI error properties of DOW recorded for 10 times.

DESCRIPTION OF THE PREFERRED EMBODIMENTS (Phase-Change Optical Recording Medium and Recording and Reproducing Method Thereof)

The phase-change optical recording medium according to the present invention contains a substrate and at least a recording layer composed of the phase-change material disposed on the substrate and further contains other layers as necessary.

The first embodiment of the phase-change optical recording medium has a maximum recording linear velocity $V_H$ of 20 m/s to 60 m/s, a range of linear velocity recordable even when the recording linear velocity is continuously changed of $0.3V_H$ to $1.0V_H$ and no crystals causing a reproduction error in recorded marks.

The second embodiment of the phase-change optical recording medium has a maximum recording linear velocity $V_H$ of 20 m/s to 60 m/s, a range of linear velocity recordable even when the recording linear velocity is continuously changed of $0.3V_H$ to $1.0V_H$, jitter of less than 12% and reproduction error of 350 or less when 10 repeated recordings are performed.

In the optical recording medium, recording of information is preferably performed by amorphousizing of the recording layer by a laser beam irradiation and erasing of information is preferably performed by crystallizing of the recording layer by a laser beam irradiation.

In the first embodiment of the recording and reproducing method of the phase-change optical recording medium according to the present invention, recording of information is performed by amorphousizing of the recording layer, and erasing of information is performed by crystallizing of the recording layer by irradiating the phase-change optical recording medium having at least a recording layer with a laser beam.

In the first embodiment of the recording and reproducing method of the phase-change optical recording medium according to the present invention, a maximum recording linear velocity $V_H$ is 20 m/s to 60 m/s, a range of recording linear velocity recordable even when the recording linear velocity is continuously changed is $0.3V_H$ to $1.0V_H$ and there is no occurrence of crystals causing a reproduction error in recorded marks.

In the second embodiment of the recording and reproducing method of the phase-change optical recording medium according to the present invention, recording of information is performed by amorphousizing of the recording layer, and erasing of information is performed by crystallizing of the recording layer by irradiating the phase-change optical recording medium having at least a recording layer with a laser beam.

In the second embodiment of the recording and reproducing method of the phase-change optical recording medium according to the present invention, a maximum recording linear velocity $V_H$ is 20 m/s to 60 m/s, a range of recording linear velocity recordable even when the recording linear velocity is continuously changed is $0.3V_H$ to $1.0V_H$, jitter is less than 12% and reproduction error is 350 or less when 10 repeated recordings are performed.

The reproduction error means a data error which occurs during reproducing and it also means a PI error in DVD.

The jitter is preferably less than 10% and reproduction error is preferably 280 or less.

The detail of the recording and reproducing method of the phase-change optical recording medium of the present invention will be described through the explanation of the phase-change optical recording medium of the present invention below.

First, "a phenomenon in which reproduction error increases in the range of recording linear velocity with a practical level of jitter property" discovered by the present inventors is explained in detail below.

In FIG. 1, a relation between the recording linear velocity of a phase-change optical disc developed for 8 double-speed recording of DVD+RW and jitter and PI error properties of DOW recorded for 10 times is shown as an example of the phenomenon found here. The PI error corresponds to the reproduction error mentioned above. In addition, a recording condition is utilized for the optimum jitter property. The jitter property from 3 double speeds to 8 double speeds is approximately 9% or less, on the other hand, PI error dramatically increases from 4 double speeds to 7 double speeds as shown in FIG. 1. When PI error is 350 or more, it is considered to be a practical issue. The resulted PI error is well over the number, and it turns out that jitter and PI error properties are contradicting each other. Such phenomenon had not been found in the past and this is a newly found phenomenon by the present inventors. Moreover, only a result of DOW10 recording is described here, however, similar phenomena have been verified which are DOW number-independent with only a slight difference. From this, it can be concluded that the phenomenon is not caused by heat damage, and the like. Consequently, a condition in which "there is no occurrence of a crystal causing a reproduction error in a recorded mark" in the present invention means a condition in which all recorded mark length fall within a certain region and both jitter and reproduction error properties are appropriate.

<Experiment>

Figure 6:
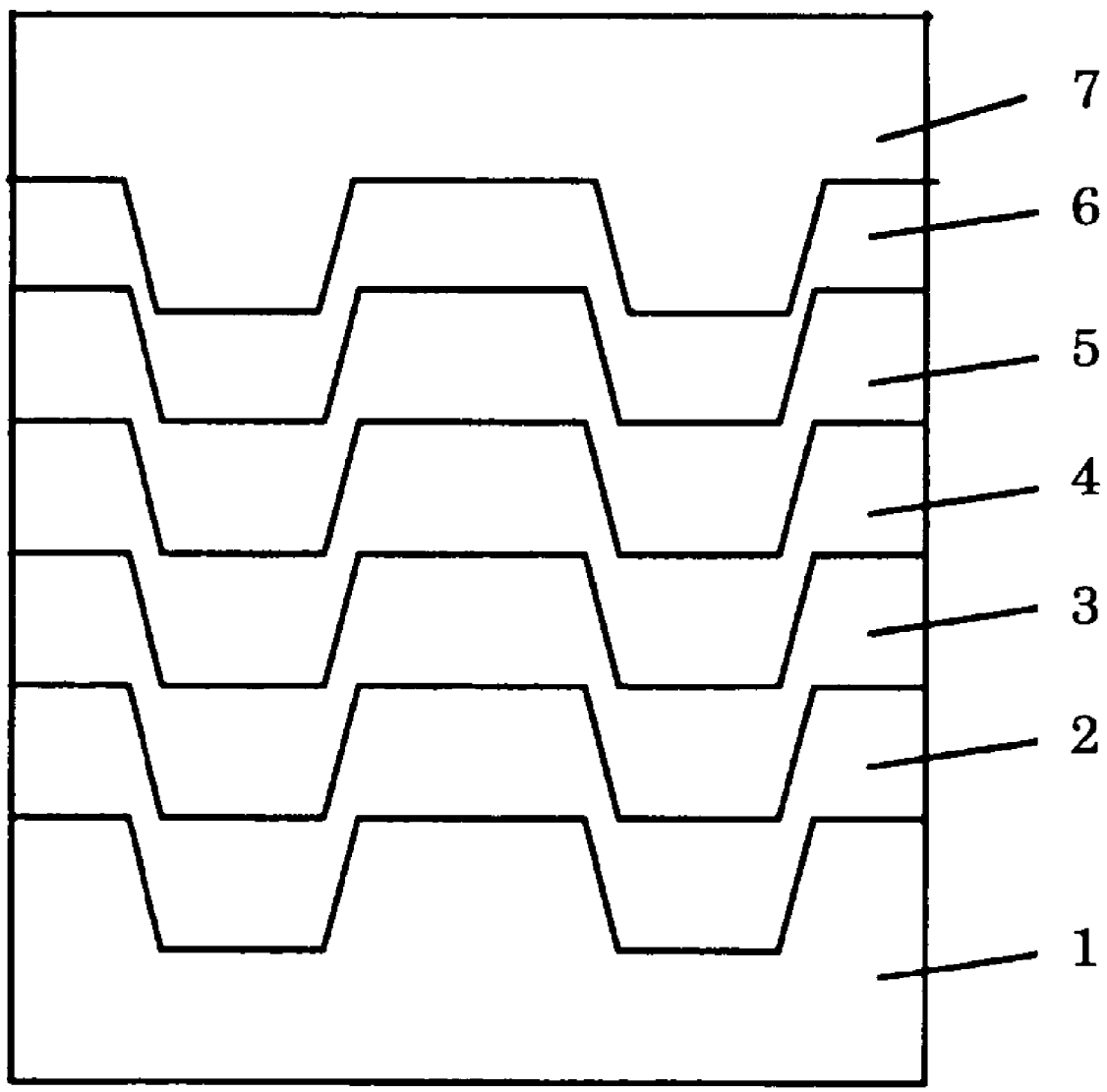
FIG. 6 is a diagram showing a general layer structure of the phase-change optical discs produced in Examples and Comparative Examples.

A phase-change optical disc of the composition as shown in FIG. 6 was produced next to investigate the detail of this phenomenon.

A polycarbonate substrate 1 of 120 mm in diameter and 0.6 mm thickness having a guiding groove of 0.74 μm track pitch, 0.3 μm width and approximately 30 nm depth was prepared. On the substrate, 60 nm thickness of first protective layer 2 composed of ZnS.SiO$_2$ (with a ratio of 80 mol %:20 mol %), 16 nm thickness of a recording layer 3 composed of a phase-change material, Ge$_{0.1}$Sb$_{0.8}$SN$_{0.1}$, 7 nm thickness of a second protective layer 4 composed of ZnS.SiO$_2$ (with a ratio of 80 mol %:20 mol %), 4 nm thickness of a sulfidation prevention layer 5 composed of TiC—TiO$_2$ and 140 nm thickness of a reflective layer 6 composed of Ag were formed in this sequence. Next, UV curing resin (SD-318 manufactured by Dainippon Ink and Chemicals, Inc.) was coated on the reflective layer and cured to form a environmental protection layer 7. Finally, the substrate was bonded with another similar substrate (not shown) and a phase-change optical disc of approximately 1.2 mm thickness was obtained. This was initialized under optimal conditions.

Figure 2:
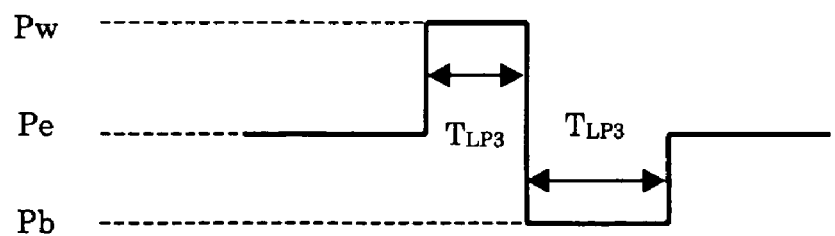
FIG. 2 is a diagram showing a recording strategy when a single pattern in which 3 T marks and 3 T spaces are arranged alternately is recorded in the optical disc of FIG. 1.

A single pattern in which 3 T marks and 3 T spaces are alternately arranged was recorded to the optical disc using the recording strategy as shown in FIG. 2. Results are shown in FIGS. 3A to 3C.

Figure 3A:
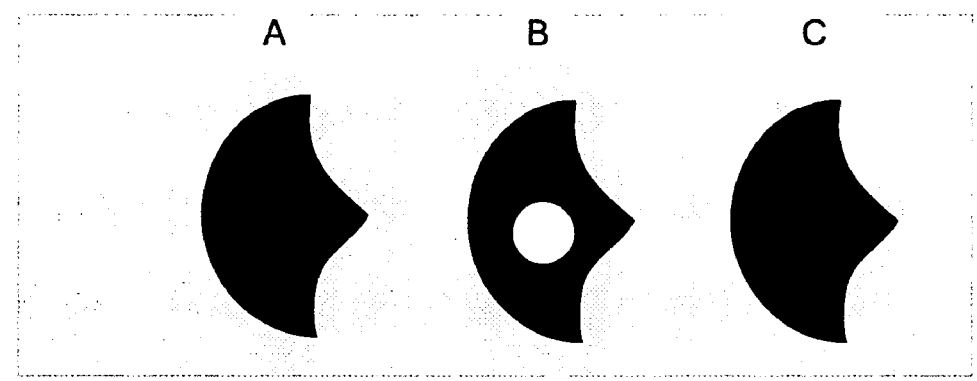
FIG. 3A is a pattern diagram showing a recorded mark configuration recorded by the recording strategy of FIG. 2.
Figure 3B:
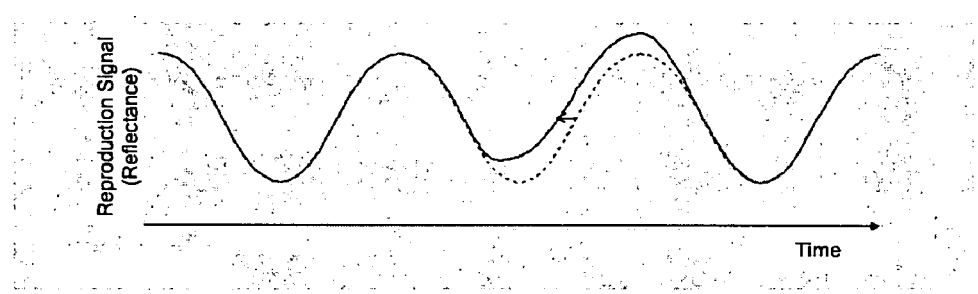
FIG. 3B is a pattern diagram showing a reproduction signal of a recorded mark recorded by the recording strategy of FIG. 2.
Figure 3C:
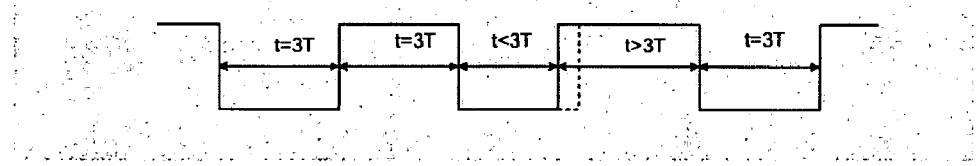
FIG. 3C is a pattern diagram showing a signal of a recorded mark after becoming a binary recorded by the recording strategy of FIG. 2.

FIG. 3A is a view showing a recorded mark configuration. The mark configuration is a reproduction drawn from the observation with a transmission electron microscope. As shown in FIG. 3A, mark A and mark C are normal recorded marks and mark B is an abnormal mark in which crystallization is occurring in the mark. When there is a crystallization in the mark, reproduction signal is distorted as the solid line relative to the dot-line indicating a normal reproduction signal as shown in FIG. 3B. As a result, the signal after becoming a binary becomes like the solid line of FIG. 3C and only mark B having crystallization is reproduced shorter than normal 3 T marks shown with dot-line. Though only the data of 3 T single pattern recording is shown here, a similar issue has been observed in other single patterns.

Figure 4:
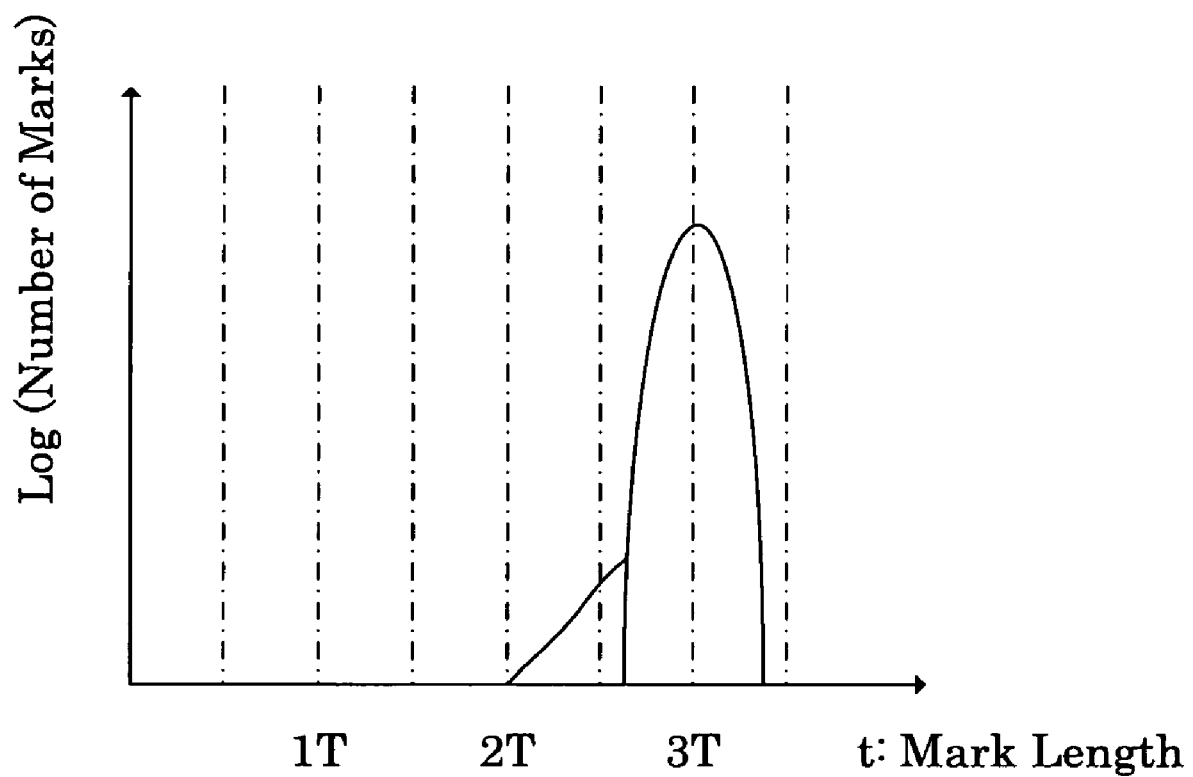
FIG. 4 is a view showing a frame format of the measurement result of the reproduced signal of FIG. 3B by a time interval analyzer (TIA).

FIG. 4 is a view showing a measurement result of above reproduction signal obtained by a time interval analyzer (TIA). This can be divided into an element with normal distribution mainly of 3 T ("distribution curve of normal mark" in FIG. 4) and an element distributed in a region shorter than 3 T ("distribution curve of abnormal mark" in FIG. 4). The elements distributed in a region shorter than 3 T corresponds to the number of abnormal marks in which crystals exist in the recorded mark and it is the cause of PI errors.

The next (1) to (3) are the examples of known effects of crystals on the amorphous mark.

(1) Recrystallized part of the recorded mark caused by residual heat. This may also be called as "cross erase". (Examples are described in JP-A No. 2004-164850)

(2) Incomplete erasure due to insufficient crystallization in high-speed recording. (Examples are described in JP-A No. 2004-164849)

(3) Deposition of crystals around the amorphous mark caused by DOW recording performed for a dozen times. (Examples are described in JP-A No. 04-286683 and No. 06-103609 and Japanese Patent No. 3474714)

However, it turns out that the phenomenon the present inventors have found is completely different from conventionally known phenomena because it is independent of DOW recording numbers, crystallization is not occurring in all amorphous marks, reproduction error is extremely large even though the jitter property is in a right range, and crystals exist in the mark instead of around the mark.

Moreover, it is believed that when the recording density becomes as high as that of DVD, the crystals existing in recorded marks cause reproduction error to increase. It is a significant issue for the phase-change optical disc using a blue laser of an extra high-speed recording.

The process by which an amorphous recorded mark is formed is thought of as the following.

First, phase-change material is heated and melted to become a liquid state at the moment the recording power Pw is irradiated. Next, heating by laser stops as the laser power decreases abruptly from Pw to the bottom power Pb and the temperature also decreases abruptly by cooling effect of the optical disc itself and the phase-change material changes its state to solid. The phase-change material becomes amorphous with this cooling speed.

The detail of causes of the phenomenon the present inventors discovered is unknown in this process, however, it is believed that three factors of (1) heat change, (2) formation of crystal nucleus involving the heat change and (3) crystal growth are closely linked.

The factors (2) and (3) are no surprises considering the formation mechanism of crystals and the factor (1) was qualitatively confirmed by conducting further experiment as follow.

Meanwhile, most of abnormal marks are 3 T marks, the shortest marks in DVD, and it is thought of as strongly dependent on mark length. Since the length of 3 T mark is 0.4 µm and the length of next longer 4 T mark is 0.53 µm, the mark length at which those abnormal marks occur frequently is considered to be 0.5 µm or less. In fact, no such phenomenon has been observed in CD-RW media of which the shortest mark length is 0.84 µm.

Figure 5:
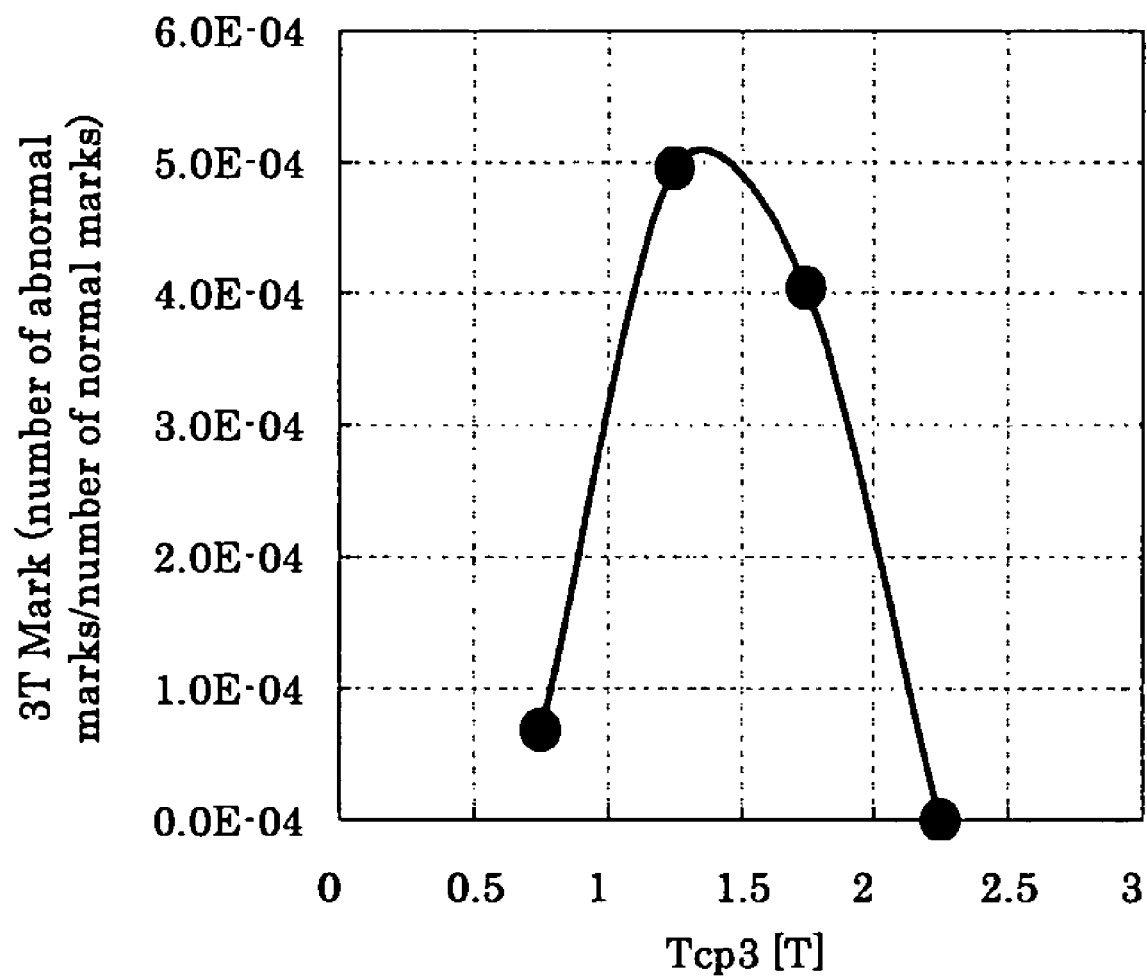
FIG. 5 is a diagram showing the investigation result of the relation between a length of bias power irradiation time Tcp3 and event probability of defect mark formation when the recording strategy of FIG. 2 is applied.

Results of investigation on the relation between the length of bias power irradiation time Tcp3 and event probability of abnormal marks when the recording strategy shown in FIG. 2 is utilized is shown in FIG. 5. The recording condition was similar to above-mentioned and vertical axis of the graph indicates the value obtained by dividing number of abnormal marks measured by TIA by number of normal marks and the horizontal axis indicates the length of time of Tcp3 expressed by using a length of time T based on the standard clock frequency of 8 double-speed recording. It turns out that event probability of abnormal marks changes corresponding to the change in length of Tcp3 and the heat change is closely linked with event probability of abnormal marks.

In the mean time, it is expected that occurrence of abnormal marks is suppressed by adjusting the recording strategy from above results. However, if the recording strategy is changed, the effect on other disc properties is also significant and simultaneous pursuit of appropriate disk properties and reduction of abnormal marks may be impossible. For example, it is apparent that satisfying Tcp3>2.0 T or Tcp3<0.8 T is necessary for reduction of abnormal marks from the result shown in FIG. 5, however, it has been found that in the range of Tcp3>2.0 T, cooling effect becomes too much resulting in amorphous marks spread unnecessary and jitter property is deteriorated. And in the range of Tcp3<0.8 T, cooling effect becomes small leading to deterioration of repeated recording property.

It has been found that because using recording strategy for controlling heat changes also affects other disc properties, formation of crystal nucleus and optimization of crystal growth are most important factors for suppressing abnormal marks and optimization of the phase-change material is essential for this purpose. Moreover, since it is necessary to examine the interface condition between recording layer and protective layer for formation of crystal nucleus and crystal growth, examining the protective layer material (or interface layer material when interface layer is disposed) adjacent to the recording layer becomes also necessary.

In consequence, the phase-change optical recording medium capable of high-speed recording at the maximum recording linear velocity $V_H$ of 20 m/s to 60 m/s, with a range of recording linear velocity recordable even when the recording linear velocity is continuously changed of $0.3V_H$ to $1.0V_H$ and there is no occurrence of crystals causing reproduction error in the recorded mark can be implemented by utilizing the phase-change optical recording medium of the present invention described later.

The "main element" in the text means an element taking over 90 atomic % or more of entire phase-change material used for the protective layer.

Since "the phenomenon in which reproduction error increases in the range of recording linear velocity with a practical level of jitter property" discovered by the present inventors is likely to occur when the mark size is 0.5 μm or less, the present invention effectively function when the mark size is 0.5 μm or less. The reason why crystal part is likely to form in the mark as the mark size becomes smaller is unknown but it is thought to be as follow.

When mark size becomes smaller, it is necessary to induce a phase change into amorphous state in shorter time period, however, speeding up of pulse modulation or power modulation of a laser beam is limited and it is impossible to form a uniform amorphous mark using the phase-change material for high-speed recording as it has previously been thought.

Furthermore, if the condition, "the phase-change optical recording medium is a rewritable DVD disc in which a recording at a linear velocity of 3.3 double speeds to 8 double speeds is possible and PI error is 350 or less" is fulfilled, crystal part is likely to form in the recorded mark shown in FIG. 1. In particular, if "a recording at a linear velocity of 4 double speeds to 6 double speeds is possible and PI error is 350 or less", crystal part is likely to form in the mark and PI error increases. These problems can be settled by utilizing above composition of the present invention. It is preferable that the rewritable DVD disc is one of DVD-RW and DVD+RW.

The PI error is one of the reproduction errors in the DVD media and if PI error increases, error rate of remodulation of the signal recorded from the digital data modulation becomes large and reading becomes impossible. It is not necessarily appropriate to suggest that how many PI errors impose practical issue because it depends on the capacity of driving mechanism of the disc used. However, it is thought that when PI error is 350 or more in the driving mechanism for development used in the invention, it becomes an issue in the driving mechanisms commercially available.

It is preferable to use the phase-change material expressed by following Equations 1 to 3 for the protective layer of the phase-change optical recording medium of the present invention.

$$Sb_\alpha Z_\beta Q_\delta \qquad \text{Equation 1}$$

In Equation 1, "Z" represents Sn and one of Sn having at least one additive element selected from Bi, Pb and 0. "Q" represents at least one element selected from Ge, Si and C. Each "α", "β" and "δ" represents an atomic ratio and satisfies $0.50 \leq \alpha \leq 0.79$, $0.10 \leq \beta \leq 0.30$ and $0.03 \leq \delta \leq 0.25$.

$$Sb_{\alpha 1} Z_{\beta 1} J_{\gamma 1} Q_{\delta 1} \qquad \text{Equation 2}$$

In Equation 2, "Z" represents Sn and one of Sn having at least one additive element selected from Bi, Pb and O. "J" represents one element at least selected from Al, In, Ga, N, P, As, Se, Te, Cu, Ag, Au, Ni, Pd, Pt, Zn, Mn, rare earthes, alkaline-earth metals (with an exception of Be and Ra), V, Nb, Ta, Mo, W, Co, Ti, Zr and Hf. "Q" represents at least one element selected from Ge, Si and C. Each "$\alpha_1$", "$\beta_1$", "$\gamma_1$" and "$\delta_1$" represents an atomic ratio and satisfies $0.50 \leq \alpha_1 \leq 0.79$, $0.10 \leq \beta_1 \leq 0.30$, $0.01 \leq \gamma_1 \leq 0.25$ and $0.03 \leq \delta_1 \leq 0.25$.

$$Sb_{\alpha 2} Sn_{\beta 2} Ga_{\gamma 2} Ge_{\delta 2} \qquad \text{Equation 3}$$

In Equation 3, each $\alpha_2$, $\beta_2$, $\gamma_2$ and $\delta_2$ represents an atomic ratio and satisfies $0.55 < \alpha_2 \leq 0.75$, $0.15 \leq \gamma_2 \leq 0.25$, $0.03 \leq \gamma_2 \leq 0.11$ and $0.05 \leq \delta_2 \leq 0.15$.

It is known that the crystallization speed of Sb expressed in Equations 1 to 3 is very fast and suitable to use as a base material of the phase-change material for high-speed recording. However, it has a characteristic of being easily crystallized therefore, the content is preferably 0.79 (atomic ratio) or less to suppress abnormal marks moderately. This means that the upper limit of the maximum recording linear velocity is limited to 60 m/s. On the other hand, when the content of Sb is less than 0.5, the crystallization speed is unsatisfactory and high-speed recording is impossible.

Sn expressed as "Z" element in Equations 1 and 2, or Sn containing at least one element selected from Bi, Pb and O (oxygen) has an effect to compensate the degradation of crystallization speed caused by limited Sb content. Therefore it is necessary to appropriately adjust Sb content based on the loadings of "Z" element.

The improving effect of crystallization speed similar to that of Sb can be expected from Sn, Bi or Pb because of its own high crystallization speed or the characteristic of being easily crystallized. Also, because all of them are heterogeneous elements with Sb, probability of broadening crystallized condition decreases and eventually suppresses the crystal growth better than by just increasing the content of Sb. By calling these into account, pursuing both of suppressing abnormal marks and improving crystallization speed simultaneously is thought to be as possible. The improving effect of crystallization speed of O is thought of as caused by being a material of very high melting point by being bonded with Sb and making an oxide and oxide becoming a crystal nucleus without being melted by irradiation of recording power, Pw. At the same time, because oxides prevent crystal growth, it is possible to obtain the effect similar to Sn, Bi or Pb.

However, loadings of Bi, Pb and O is preferably less than 0.05 atomic ratio and more preferably less than 0.03 atomic ratio because Bi and Pb can facilitate the occurrence of abnormal marks or make it difficult for amorphousization to occur with just a small amount of loadings and O causes Sb content to be decreased by oxidation.

For "Z" element, it is preferably 0.30 atomic ratio or less and more preferably 0.25 atomic ratio or less because amorphousization becomes difficult with too much loadings of "Z" element. And "Z" element is also preferably 0.1 atomic ratio or more, because when it is less than 0.1 atomic ratio, the effect to compensate the degradation of crystal speed for limited Sb content cannot be obtained.

The "Q" element in Equation 2 has a notable effect on suppressing the occurrence of abnormal marks. In particular, Ge has an improving effect of storage reliability. However, loadings of "Q" element has an upper limit because it significantly slows down the crystallization speed. The preferred range of loadings is from 0.03 atomic ratio to 0.25 atomic ratio and it is more preferably from 0.05 atomic ratio to 0.20 atomic ratio and most preferably from 0.07 atomic ratio to 0.20 atomic ratio. It is necessary to adjust the loadings based on the content of "Z" element which speeds up the crystallization speed.

Moreover, disc properties such as recording sensitivity, modulation degree, DOW property, storage reliability, and the like other than suppressing the occurrence of abnormal marks can be optimized by adding appropriate amount of "J" element. The loadings of "J" element depends on each element having different outcoming effects, however, it is preferably 0.25 atomic ratio or less because all elements have the effect of slowing down the crystallization speed. It is more preferably 0.20 atomic ratio or less. The lower limit also depends, however, it is preferably 0.01 atomic ratio or more.

The effects obtained by adding each "J" element will be explained below.

When Ga is added as "J" element, it is possible to obtain high degree of modulation or appropriate jitter property. On the other hand, Ga extremely slows down crystallization speed, the preferred range of loadings is from 0.04 atomic ratio to 0.11 atomic ratio and it is more preferably from 0.04 atomic ratio to 0.07 atomic ratio.

Moreover, degradation of the crystallization speed is small with In, a homologous element of Ga, and increasing effect of modulation degree of In is as same as Ga. However, when In is added too much, durability against reproduction beam is notably deteriorated; therefore, the loadings of In is preferably 0.03 atomic ratio to 0.10 atomic ratio and more preferably 0.03 atomic ratio to 0.07 atomic ratio.

When Ga and In are compared with each other, improving effect of disc property is about the same, however, archival properties such as stability against reproduction beam, storage ability of recorded signal, and the like are better for Ga therefore it is preferable to use Ga instead of In.

Furthermore, when Se, Te, Cu, Ag and Au are added, storage reliability in particular is improved. Specifically, Se has an improving effect of storage reliability without slowing down crystallization speed too much. However, because all of them have slowing effect of crystallization speed, preferred range of loadings is assigned to each element. The loadings of each Se and Te is preferably from 0.05 atomic ratio to 0.25 atomic ratio and more preferably from 0.05 atomic ratio to 0.15 atomic ratio. The loadings of each Cu, Ag and Au is preferably from 0.01 atomic ratio to 0.05 atomic ratio.

When Al, Zn, Mn, alkaline-earth metals (with an exclusion of Be and Ra) are added, initialization can be performed appropriately by reacting with impurities, oxygen in particular, which prevent crystallization in initialization process. As a result, a stable crystal condition can be obtained, and shelf properties such as jitter property of recording after being stored in unrecorded condition are improved. The loadings of each Al, Zn, Mn and alkaline-earth metals (with an exclusion of Be and Ra) are preferably in the range of 0.01 atomic ratio to 0.10 atomic ratio and it is more preferably 0.01 atomic ratio to 0.05 atomic ratio.

Moreover, when Ni, Pd, Pt, rare earthes, V, Nb, Ta, Mo, W, Co, Ti, Zr and Hf are added, crystallization temperature is increased, stability in amorphous condition is improved and storage stability is eventually improved. The loadings of each element is preferably in the range of 0.01 atomic ratio to 0.05 atomic ratio because of disadvantageous effects such as decrease in crystallization speed, difficulty in amorphousization and becoming a crystal nucleus causing occurrence of abnormal marks.

When N, P and As are added, stability in amorphous condition is improved and storage reliability is improved. The loadings of each element is preferably in the range of 0.05 atomic ratio to 0.10 atomic ratio.

Of these phase-change materials combined with each element above, SbSnGaGe is most appropriate and it is preferable to contain the phase-change material expressed in above Equation 3.

Next, layer composition of the phase-change optical recording medium of the present invention will be explained.

The phase-change optical recording medium is preferably containing a substrate and at least a first protective layer, a recording layer composed of a phase-change material, a second protective layer and a reflective layer disposed on the substrate in this sequence and further containing other layers as necessary.

It is preferable for one of the first and second protective layers contains at least one element selected from C, Si and Ge for suppressing effect of abnormal marks.

The suppressing effect in the phase-change optical recording medium of the present invention is more improved by employing above layer composition and using one of the phase-change materials expressed by above Equations 1 to 3 for the recording layer.

Containing at least one element selected from C, Si and Ge, "Q" elements which were defined as suitable for the phase-change material, in at least one of the first or second protective layer has an advantageous effect of notably suppressing abnormal marks similar to the phase-change material. Of these, Ge exhibits the most excellent effect.

It is thought of as because of notable decrease in number of crystal nucleus which forms at the interface of the phase-change material and protective layer by the effect of "Q" element. Especially since the heat generated at the interface part with the second protective layer near the reflective layer is dissipated toward the reflective layer, formation of the crystal nucleus increases as the heat increases more compared to the interface part with the first protective layer. Therefore, when "Q" element is contained in the second protective layer, more noticeable effect can be obtained. Furthermore, since all "Q" elements have an absorption in visible light region when in the form of thin film, it is not suitable for the first protective layer. However, it is usable for the first protective layer by adjusting loadings and thickness of "Q" element and other layer composition.

For above reasons, it turns out that the effect would not be satisfactory when the loadings of at least one element of C, Si and Ge is less than 10 atomic % and when it is more than 90 atomic %, recording properties at a high linear velocity is deteriorated for too much suppression of the formation of crystal nucleus at the interface part, though it depends on the optical properties of a disc. However, the most suitable range of loadings of C, Si and Ge depends on whether it is contained in the first or second protective layer or on the combined material and it is cannot be specified.

It is therefore important for the layer adjacent to the protective layer composed of the phase-change material to contain "Q" element and when an interface layer is disposed between the first or second protective layer and the recording layer, the interface layer is preferably containing "Q" element.

Specifically, at least one of the first and second protective layers is preferably composed of oxides, nitrides, sulfides, carbides or mixtures thereof containing at least one element selected from C, Si and Ge as an elementary substance. The key here is that the "Q" element exists in the material as an elementary substance, and ZnS—$SiO_2$ which is often used as a material for the protective layer of a phase-change optical disc, for example, contains Si, which is one of "Q" element, however, $SiO_2$ is in the form of oxide therefore it does not correspond to the above condition.

Examples of oxides include IIA group with an exception of Be and Ra, IIIB group to VIIB group with an exception of Tc and Re, IB group with an exception of Au, IIB group with an exception of Hg, IIIA group with an exception of B and Tl, IVA group with an exception of C, and oxides of an element at least selected from Sb and Bi. Of these, oxides of an element at least selected from Ti, Zn, In, Sn, Cr, W, Mo, Ni, Ta, Y, rare earthes, Ge and Si are especially preferable.

Examples of nitrides, carbides and sulfides include nitrides, carbides and sulfides of an element at least selected from B, Al, Si, Ti, Cr, Mn, Fe, Ga, Ge, Zr, V, Zn, Nb, Mo, Cd, In, Hf, Ta, W and rare earthes. Of these, nitrides of an element at least selected from Ge, Al, Si and Ga, carbides of an element at least selected from Si, Ti, Ge and W, sulfides of an element at least selected from Zn, Cd, Ga, Ge, Si, Al, In, Ta, Ti and Mo are especially preferable. The similar effect can be obtained by using a mixture of "Q" element and oxides, nitrides, sulfides, carbides of "Q" element or mixtures thereof such as Ge—$GeO_2$, Ge—GeN, Ge—GeC, Ge—$GeS_2$. However, compounds in a state of gas or liquid under normal temperature and pressure such as CO and $CO_2$ are not usable.

Furthermore, the material of the protective layer must satisfy generally required properties before it is applied to the phase-change optical recording medium. For example, the first protective layer is required to have translucency and satisfy optical properties needed to optimize reflectance or modulation degree of a disc. On the other hand, the second protective layer is required to have a certain range of heat conductivity in order to adjust the heating and cooling effects on the recording layer and also satisfy optical properties similar to the first protective layer. Moreover, both protective layers are required to be thermally and chemically stable.

The thickness of the first and the second protective layers depends on the optical and thermal properties of other layers and cannot be specified. It is known that the thickness of the first protective layer significantly affect reflectance and the reflectance show sinusoidal change relative to the thickness change of the first protective layer. If the thickness is adjusted so that the reflectance stays at its minimum, light enters the recording layer most effectively and this leads to the improvement of recording sensitivity or appropriate formation of the mark. If however, reflectance is too low, reading a data signal becomes difficult; therefore, it is preferable to adjust the relationship to make a most suitable thickness.

The thickness of recording layer is preferably 5 nm to 30 nm and more preferably 10 nm to 20 nm. If the thickness is less than 5 nm, it is impossible to store sufficient heat for initiating a phase change in the recording layer. On the other hand, if the thickness is more than 30 nm, heat dissipation effect is lost and amorphousization may become difficult.

Metal materials such as Al, Ag, Au and Cu and alloys thereof can be used for the reflective layer to obtain appropriate optical properties and heat conductivity. And because a quenching structure is desired for the present invention in particular, Ag and alloy thereof having highest heat conductivity are preferable. When Ag is used for the reflective layer and a protective layer composed of sulfides is used as a second protective layer, sulfuration of Ag caused by sulfur element is concerned and it is necessary to dispose a sulfidation prevention layer between the second protective layer and the reflective layer. The material used for the sulfidation prevention layer should have a strong resistance against sulfuration and in particular, metal films such as Si and Al, nitrides such as SiN and AlN, carbides such as SiC and TiC, oxides such as $SiO_2$, $Al_2O_3$, $TiO_2$ and $ZrO_2$ or mixtures thereof can be used.

The thickness of sulfidation prevention layer is preferably 2 nm to 20 nm, more preferably 3 nm to 10 nm and most preferably 3 nm to 5 nm. If the thickness is less than 2 nm, it is likely to lose its sulfidation prevention effect. If the thickness is more than 20 nm, it may significantly affect the heat dissipation effect or optical properties of the sulfidation prevention layer.

The thickness of reflective layer is preferably 100 nm to 300 nm and more preferably 120 nm to 250 nm. If the thickness is less than 100 nm, heat dissipation effect cannot be obtained, and if the thickness is more than 300 nm, the heat dissipation effect does not change and only a film of unnecessary thickness is formed.

In addition, the layer composition is not limited to above layer composition and it is possible to improve disc properties by making each layer a laminated composition containing plural layers.

EXAMPLES

By the present invention, a phase-change optical recording medium capable of suppressing a new problem, an occurrence of crystallization in recorded marks, performing a recording at high linear velocity and pursuing appropriate PI error and jitter properties simultaneously in a wide range of linear velocity is provided.

Hereinbelow, with referring to Examples and Comparative Examples, the invention is explained in detail and the following Examples and Comparative Examples should not be construed as limiting the scope of the invention. An overview of layer structure of the phase-change optical discs produced in Examples and Comparative Examples is shown in FIG. 6.

Examples 1 to 21 and Comparative Examples 1 to 13

A polycarbonate substrate of 120 mm diameter and 0.6 mm thickness having a guiding groove of 0.74 μm track pitch, 0.3 μm groove (convex portion) width and approximately 30 nm depth was provided.

On the polycarbonate substrate, a first protective layer of 60 nm thickness, composed of $ZnS.SiO_2$ with a ratio of 80 mol %:20 mol % was formed at a sputtering power of 4.5 kW and film-forming rate of 9 nm/sec.

Next, a recording layer of 16 nm thickness, composed of the phase-change material in Table 1 was formed at a sputtering power of 0.9 kW and film-forming rate of 5 nm/sec.

A second protective layer of 7 nm thickness, composed of $ZnS.SiO_2$ with a ratio of 80 mol %:20 mol % was then formed at a sputtering power of 1.5 kW and film-forming rate of 4 nm/sec.

Next, a sulfidation prevention layer of 4 nm thickness, composed of TiC—$TiO_2$ was formed at a sputtering power of 1.0 kW and film-forming rate of 1 nm/sec.

Finally, a reflective layer of 140 nm thickness, composed of Ag was formed at a sputtering power of 3.0 kW and film-forming rate of 35 nm/sec.

For the formation of $ZnS.SiO_2$ with a ratio of 80 mol %:20 mol %, RF magnetron sputtering was employed. For the formation of the recording layer, TiC—$TiO_2$ and Ag, DC magnetron sputtering was employed.

In addition, a UV curing resin (SD-318 manufactured by Dainippon Ink and Chemicals, Inc.) was coated and cured to form an environmental protection layer. Finally, above polycarbonate substrate and a similar substrate (not shown) were bonded together to produce a phase-change optical disc of approximately 1.2 mm thickness for each Example 1 to 21 and Comparative Example 1 to 13.

<Initialization>

Each above disc was then initialized using an initializer (POP120-7AH manufactured by Hitachi Computer Peripherals Co., Ltd.) having a laser head with an additional focusing function on the laser beam of 830 nm output wavelength, approximately 1 μm width, approximately 75 μm length and approximately 2 W maximum output power. Initialization condition was set constant at an initialization power of 2,000 mW, a linear velocity of 20 m/s and a feed speed by head of 50 μm. Because the maximum linear velocity of constant linear velocity system (CLV system) was 18.5 m/s for this initializer, initialization was conducted by the constant angle velocity system (CAV system).

<Evaluation>

Reproduction error (PI error) property and jitter property at a recording linear velocity of 11.5 m/s to 27.9 m/s for each disc produced above were evaluated. The range of recording linear velocity corresponds to 3.3 double speeds to 8 double speeds when a standard linear velocity of DVD was set at 1 double speed.

An optical disc evaluation apparatus (DDU-1000 manufactured by Pulstec Industrial Co., Ltd.) having a pickup of 650 nm wavelength and 0.65 numerical apertures was employed for recording in evaluation. Recording was conducted by pulse modulation method and modulation was conducted by EFM+[8/16(2,10)RLL] modulation method. Recording linear density was set at 0.267 μm/bit and recording was performed in grooves. The recording power Pw and erasing power Pe were set at optimum condition. Bottom power Pb was set constant at 0.1 mW. And repeated recording was performed in approximately 400 tracks for 10 times (DOW10).

Each jitter property was then measured by reproducing a recorded part at 1 double speed. The reproduction beam power was set at 0.7 mW.

Jitter property was evaluated according to the evaluation standard below.

| Less than 9%: A | 9% to less than 10%: B |
| 10% to less than 12%: C | More than 12%: D |

An optical disc evaluation apparatus (DDU-1000 manufactured by Pulstec Industrial Co., Ltd.) having a pickup of 650 nm wavelength and 0.6 numerical apertures was employed for reproducing in PI error evaluation.

PI error was evaluated according to the evaluation standard below.

| Less than 100: | A (suitable range for practical use) |
| 100 to 280: | B (practicable range) |
| 281 to 350: | C (acceptable range) |
| More than 350: | D ("need improvement" range) |

TABLE 1

| | Material of Phase-Change Recording Layer (in atomic mass) | | | | | | | | PI Error at DOW10 Recording (x: double speed) | | | | | | Jitter Property at DOW10 Recording (x: double speed) | | | | | |
|---|---|---|---|---|---|---|---|---|---|---|---|---|---|---|---|---|---|---|---|---|
| | Sb | Bi | Sn | Pb | O | Ge | Si | C | 3.3× | 4× | 5× | 6× | 7× | 8× | 3.3× | 4× | 5× | 6× | 7× | 8× |
| Example 1 | 0.62 | none | 0.20 | none | none | 0.18 | none | none | A | A | A | A | A | A | B | B | B | B | B | B |
| Comp. Example 1 | 0.80 | none | 0.10 | none | none | 0.10 | none | none | A | C | D | D | B | A | B | B | B | B | B | B |
| Example 2 | 0.79 | none | 0.11 | none | none | 0.10 | none | none | B | C | C | C | B | B | B | B | B | B | B | B |
| Example 3 | 0.79 | none | 0.10 | none | none | 0.11 | none | none | A | B | C | C | A | A | B | B | B | B | B | B |
| Comp. Example 2 | 0.49 | none | 0.30 | none | none | 0.21 | none | none | C | C | B | B | A | A | D | D | C | C | B | B |
| Example 4 | 0.50 | none | 0.30 | none | none | 0.20 | none | none | B | B | B | B | A | A | B | B | B | B | B | B |
| Comp. Example 3 | 0.79 | none | 0.19 | none | none | 0.02 | none | none | A | D | D | D | C | A | B | B | B | B | B | B |
| Example 5 | 0.79 | none | 0.18 | none | none | 0.03 | none | none | A | C | C | B | B | A | B | B | B | B | B | B |
| Example 6 | 0.77 | none | 0.18 | none | none | 0.05 | none | none | A | B | B | B | B | A | B | B | B | B | B | B |
| Example 7 | 0.75 | none | 0.18 | none | none | 0.07 | none | none | A | A | A | A | A | A | B | B | B | B | B | B |
| Comp. Example 4 | 0.57 | none | 0.17 | none | none | 0.26 | none | none | A | A | A | B | C | C | B | B | B | C | D | D |
| Example 8 | 0.58 | none | 0.17 | none | none | 0.25 | none | none | A | A | A | A | A | A | B | B | B | B | B | B |
| Example 9 | 0.62 | none | 0.17 | none | none | 0.21 | none | none | A | A | A | A | A | A | B | B | B | B | B | B |
| Example 10 | 0.63 | none | 0.17 | none | none | 0.20 | none | none | A | A | A | A | A | A | B | B | B | B | B | B |
| Comp. Example 5 | 0.79 | none | 0.09 | none | none | 0.12 | none | none | A | A | A | B | C | D | B | B | B | C | D | D |
| Example 11 | 0.78 | none | 0.10 | none | none | 0.12 | none | none | A | B | C | C | A | A | B | B | B | B | B | B |
| Comp. Example 6 | 0.50 | none | 0.31 | none | none | 0.19 | none | none | C | C | B | A | A | A | D | D | B | B | B | B |
| Example 12 | 0.50 | none | 0.30 | none | none | 0.20 | none | none | B | B | B | A | A | A | C | C | B | B | B | B |
| Example 13 | 0.57 | none | 0.25 | none | none | 0.18 | none | none | A | A | A | A | A | A | B | B | B | B | B | B |
| Example 14 | 0.56 | none | 0.26 | none | none | 0.18 | none | none | A | A | A | A | A | A | B | B | B | B | B | B |
| Comp. Example 7 | 0.62 | 0.05 | 0.15 | none | none | 0.18 | none | none | A | C | D | D | D | A | B | B | B | B | B | B |
| Example 15 | 0.62 | 0.04 | 0.16 | none | none | 0.18 | none | none | A | A | B | C | B | A | B | B | B | B | B | B |
| Comp. Example 8 | 0.62 | none | 0.15 | 0.05 | none | 0.18 | none | none | D | C | D | D | D | A | C | B | B | B | B | B |
| Example 16 | 0.62 | none | 0.16 | 0.04 | none | 0.18 | none | none | B | B | B | B | A | A | B | B | B | B | B | B |
| Comp. Example 9 | 0.62 | none | 0.15 | none | 0.05 | 0.18 | none | none | A | C | D | D | B | A | B | B | B | B | B | B |
| Example 17 | 0.62 | none | 0.16 | none | 0.04 | 0.18 | none | none | A | B | B | C | A | A | B | B | B | B | B | B |
| Comp. Example 10 | 0.79 | none | 0.19 | none | none | none | 0.02 | none | B | D | D | D | D | A | B | B | B | B | B | B |
| Example 18 | 0.79 | none | 0.18 | none | none | none | 0.03 | none | A | C | C | C | B | A | B | B | B | B | B | B |
| Comp. Example 11 | 0.57 | none | 0.17 | none | none | none | 0.26 | none | A | A | A | C | C | D | B | B | B | D | D | D |
| Example 19 | 0.58 | none | 0.17 | none | none | none | 0.25 | none | A | A | A | A | B | B | B | B | B | B | C | C |
| Comp. Example 12 | 0.79 | none | 0.19 | none | none | none | none | 0.02 | B | D | D | D | D | B | B | B | B | B | B | B |
| Example 20 | 0.79 | none | 0.18 | none | none | none | none | 0.03 | A | C | C | C | B | A | B | B | B | B | B | B |
| Comp. Example 13 | 0.57 | none | 0.17 | none | none | none | none | 0.26 | A | A | B | C | C | D | B | B | B | D | D | D |
| Example 21 | 0.58 | none | 0.17 | none | none | none | none | 0.25 | A | A | A | B | B | B | B | B | B | B | C | C |

From the results shown in Table 1, it turns out that performing a high-speed recording and pursuing appropriate PI error and jitter properties simultaneously in the wide range of linear velocity are possible by employing the composition of above Examples. Meanwhile, when Bi, Pb and O are added to Sn in the Examples, a similar result can be obtained as in Examples 15 to 17. In addition, when two or more of Ge, Si and C are used in the Examples, a similar result can be obtained as in Examples 5 to 10 and 18 to 21.

By the present invention, a phase-change optical recording medium capable of suppressing a new problem, an occurrence of crystallization in recorded marks, performing a recording at high linear velocity and pursuing appropriate PI error and jitter properties simultaneously in a wide range of linear velocity is provided.

Furthermore, 3 T mark recording was performed for the media of Comparative Examples of which pursuing appropriate PI error and jitter properties simultaneously is impossible. As a result, a part of the reproduction signal was reproduced short and when it was evaluated by TIA, an element distributed in the region shorter than 3 T was identified as similar to FIG. 4.

Examples 22 to 57

The phase-change optical discs of Examples 22 to 57 were produced and evaluated similarly to Example 1 except for using the phase-change material based on Sb—Sn—Ge as shown in Table 2.

Results are shown in Table 2. Evaluation standards for PI error and jitter properties are the same as in Table 1.

TABLE 2

| | Material of Phase-Change Recording Layer (in atomic mass) | | | | | | | | | | | |
|---|---|---|---|---|---|---|---|---|---|---|---|---|
| | Sb | Sn | Ge | In | Ga | Te | Ag | Mn | Zn | Ta | V | N |
| Example 22 | 0.62 | 0.20 | 0.06 | none | 0.12 | none | none | none | none | none | none | none |
| Example 23 | 0.62 | 0.20 | 0.07 | none | 0.11 | none | none | none | none | none | none | none |
| Example 24 | 0.62 | 0.20 | 0.11 | none | 0.07 | none | none | none | none | none | none | none |
| Example 25 | 0.62 | 0.20 | 0.15 | none | 0.03 | none | none | none | none | none | none | none |
| Example 26 | 0.62 | 0.20 | 0.14 | none | 0.04 | none | none | none | none | none | none | none |
| Example 27 | 0.62 | 0.20 | 0.07 | 0.11 | none | none | none | none | none | none | none | none |
| Example 28 | 0.62 | 0.20 | 0.08 | 0.10 | none | none | none | none | none | none | none | none |
| Example 29 | 0.62 | 0.20 | 0.11 | 0.07 | none | none | none | none | none | none | none | none |
| Example 30 | 0.62 | 0.20 | 0.16 | 0.02 | none | none | none | none | none | none | none | none |
| Example 31 | 0.62 | 0.20 | 0.15 | 0.03 | none | none | none | none | none | none | none | none |
| Example 32 | 0.53 | 0.15 | 0.06 | none | none | 0.26 | none | none | none | none | none | none |
| Example 33 | 0.53 | 0.15 | 0.07 | none | none | 0.25 | none | none | none | none | none | none |
| Example 34 | 0.63 | 0.15 | 0.07 | none | none | 0.15 | none | none | none | none | none | none |
| Example 35 | 0.62 | 0.20 | 0.14 | none | none | 0.04 | none | none | none | none | none | none |
| Example 36 | 0.62 | 0.20 | 0.13 | none | none | 0.05 | none | none | none | none | none | none |
| Example 37 | 0.64 | 0.20 | 0.10 | none | none | none | 0.06 | none | none | none | none | none |
| Example 38 | 0.65 | 0.20 | 0.10 | none | none | none | 0.05 | none | none | none | none | none |
| Example 39 | 0.61 | 0.20 | 0.18 | none | none | none | 0.01 | none | none | none | none | none |
| Example 40 | 0.62 | 0.20 | 0.07 | none | none | none | none | 0.11 | none | none | none | none |
| Example 41 | 0.62 | 0.20 | 0.08 | none | none | none | none | 0.10 | none | none | none | none |
| Example 42 | 0.62 | 0.20 | 0.13 | none | none | none | none | 0.05 | none | none | none | none |
| Example 43 | 0.61 | 0.20 | 0.18 | none | none | none | none | 0.01 | none | none | none | none |
| Example 44 | 0.62 | 0.20 | 0.07 | none | none | none | none | none | 0.11 | none | none | none |
| Example 45 | 0.62 | 0.20 | 0.08 | none | none | none | none | none | 0.10 | none | none | none |
| Example 46 | 0.62 | 0.20 | 0.13 | none | none | none | none | none | 0.05 | none | none | none |
| Example 47 | 0.61 | 0.20 | 0.18 | none | none | none | none | none | 0.01 | none | none | none |
| Example 48 | 0.64 | 0.20 | 0.10 | none | none | none | none | none | none | 0.06 | none | none |
| Example 49 | 0.65 | 0.20 | 0.10 | none | none | none | none | none | none | 0.05 | none | none |
| Example 50 | 0.61 | 0.20 | 0.18 | none | none | none | none | none | none | 0.01 | none | none |
| Example 51 | 0.64 | 0.20 | 0.10 | none | none | none | none | none | none | none | 0.06 | none |
| Example 52 | 0.65 | 0.20 | 0.10 | none | none | none | none | none | none | none | 0.05 | none |
| Example 53 | 0.61 | 0.20 | 0.18 | none | none | none | none | none | none | none | 0.01 | none |
| Example 54 | 0.62 | 0.20 | 0.14 | none | none | none | none | none | none | none | none | 0.04 |
| Example 55 | 0.62 | 0.20 | 0.13 | none | none | none | none | none | none | none | none | 0.05 |
| Example 56 | 0.62 | 0.20 | 0.07 | none | none | none | none | none | none | none | none | 0.11 |
| Example 57 | 0.62 | 0.20 | 0.08 | none | none | none | none | none | none | none | none | 0.10 |

| | PI Error at DOW10 Recording (x: double speed) | | | | | | Jitter Property at DOW10 Recording (x: double speed) | | | | | |
|---|---|---|---|---|---|---|---|---|---|---|---|---|
| | 3.3x | 4x | 5x | 6x | 7x | 8x | 3.3x | 4x | 5x | 6x | 7x | 8x |
| Example 22 | A | A | B | B | B | B | A | A | B | B | B | D |
| Example 23 | A | A | B | B | B | B | A | A | A | A | B | C |
| Example 24 | A | A | A | A | A | A | A | A | A | A | A | A |
| Example 25 | A | A | A | A | A | A | A | A | B | B | B | B |
| Example 26 | A | A | A | A | A | A | A | A | A | A | B | B |
| Example 27 | A | A | B | B | B | B | A | A | A | A | B | B |
| Example 28 | A | A | B | B | B | B | A | A | A | A | B | B |
| Example 29 | A | A | A | A | A | A | A | A | A | A | A | A |
| Example 30 | A | A | A | A | A | A | A | A | A | B | B | B |
| Example 31 | A | A | A | A | A | A | A | A | A | A | A | A |
| Example 32 | A | A | B | C | D | D | A | A | C | D | D | D |
| Example 33 | A | A | A | B | B | C | A | A | B | B | C | C |
| Example 34 | A | A | B | B | B | B | A | A | A | A | B | B |
| Example 35 | A | A | A | A | A | A | A | A | A | B | B | B |
| Example 36 | A | A | A | A | A | A | A | A | A | B | B | B |
| Example 37 | A | A | B | B | D | D | A | A | B | B | C | D |

TABLE 2-continued

| | | | | | | | | | | | | |
|---|---|---|---|---|---|---|---|---|---|---|---|---|
| Example 38 | A | A | A | A | B | C | A | A | A | A | B | C |
| Example 39 | A | A | A | A | A | A | A | A | B | B | B | B |
| Example 40 | A | A | B | B | B | D | A | A | B | B | C | D |
| Example 41 | A | A | B | B | B | B | A | A | B | B | B | C |
| Example 42 | A | A | A | A | A | A | A | A | A | A | A | A |
| Example 43 | A | A | A | A | A | A | A | A | A | B | B | B |
| Example 44 | A | A | B | B | B | D | A | A | B | B | C | D |
| Example 45 | A | A | B | B | B | B | A | A | B | B | B | C |
| Example 46 | A | A | A | A | A | A | A | A | A | A | A | A |
| Example 47 | A | A | A | A | A | A | A | A | A | B | B | B |
| Example 48 | B | C | C | D | D | D | A | A | B | C | D | D |
| Example 49 | A | B | B | B | C | C | A | A | B | B | C | C |
| Example 50 | A | A | A | A | A | A | A | A | B | B | B | B |
| Example 51 | B | C | C | D | D | D | A | A | B | C | D | D |
| Example 52 | A | B | B | B | C | C | A | A | B | B | C | C |
| Example 53 | A | A | A | A | A | A | A | A | B | B | B | B |
| Example 54 | A | A | A | A | A | A | A | A | B | B | B | B |
| Example 55 | A | A | A | A | A | A | A | A | B | B | B | B |
| Example 56 | A | A | B | B | C | C | A | A | B | C | C | D |
| Example 57 | A | A | B | B | B | B | A | A | B | B | B | C |

From the results shown in Table 2, it turns out that the properties at lower linear velocity were improved by adding "J" element into Sb—Sn—Ge in all Examples. It is believed that the properties at lower linear velocity were improved due to additive element which slows down the crystallization speed. Therefore, although loadings of each element differs, when it was added too much, properties at higher linear velocity were deteriorated.

When Examples 22 and 23 are compared, jitter property of Example 22 is worse than Example 23. It is believed that because Ga loadings was too much in Example 22 that the crystallization speed had slowed down. And when Examples 25 and 26 are compared, jitter property in Example 26 is better than Example 25. It is believed that because Ga loadings was large in Example 26, degree of modulation was increased. Similarly, with reference to Examples 30 and 31, jitter property of Example 31 is better because of the difference in degree of modulation by In loadings.

Next, although properties of Examples 27 and 28 are about the same, when a large reproduction beam of 1.2 mW was irradiated to the tracks after DOW10 recording similar to Example 1 for comparison of resistance properties against reproduction beam, jitter increase started after approximately 200 times for Example 27 while there was no change in jitter property until approximately 10,000 times of irradiation for Example 28. This is thought to be caused by too much In loadings in Example 27.

From the result described above, it was concluded that Ga and In loadings are preferably in the range as described above.

Next, although properties of Examples 35 and 36 are about the same, when jitter and shelf properties after DOW1 recording similar to Example 1 were investigated after each produced disc was left unattended under environment of 60° C. and 30% RH for 24 hours for comparison of storage reliability, jitter property of Example 36 was smaller than Example 35. From the result, it was concluded that Te loadings is preferably in the range as described above.

Next, shelf properties of Examples 39, 43, 47, 50 and 53 were compared with Example 1 by using a comparison method similar to Examples 35 and 36.

As a result, all jitter properties of Examples 39, 43, 47, 50 and 53 were small relative to Example 1. Therefore it was concluded that each loadings of Ag, Mn, Zn, Ta and V is preferably in the range as described above.

From the results described above, it turns out that by employing the composition of above Examples, performing a high-speed recording and pursuing appropriate PI error and jitter properties simultaneously in the wide range of linear velocity are possible. When Bi, Pb and O are mixed into Sn in the Examples, similar results can be obtained. In addition, when Si and C are used in the Examples instead of Ge, or when two or more of Si and C are used, the results are going to be similar to that of the Examples. Moreover, it is possible to obtain the results similar to that of the Examples when Se is used instead of Te; when Cu and Au are used instead of Ag; when Al and alkaline-earth metals (with an exception of Be and Ra) are used instead of Zn and Mn; when Ni, Pd, Pt, rare earthes, Nb, Mo, W, Co, Ti, Zr and Hf are used instead of Ta and V; and when P and As are used instead of N.

Examples 58 to 73

The composition ratio of Sb—Sn—Ga—Ge, which is considered to be an exceptionally suitable phase-change material, was altered and the phase-change optical discs of Examples 58 to 73 were produced and evaluated similarly to Example 1.

Results are shown in Table 3. The evaluation standards of PI error and jitter properties are the same as in Table 1. In addition, data of Example 24 is shown for comparison.

TABLE 3

| | Material of Phase-Change Recording Layer (in atomic mass) | | | | PI Error of DOW10 Recording (x: double speed) | | | | | | Jitter Property of DOW10 Recording (x: double speed) | | | | | |
|---|---|---|---|---|---|---|---|---|---|---|---|---|---|---|---|---|
| | Sb | Sn | Ge | Ga | 3.3× | 4× | 5× | 6× | 7× | 8× | 3.3× | 4× | 5× | 6× | 7× | 8× |
| Example 24 | 0.62 | 0.20 | 0.11 | 0.07 | A | A | A | A | A | A | A | A | A | A | A | A |
| Example 58 | 0.75 | 0.13 | 0.07 | 0.05 | A | B | C | C | A | A | A | A | A | A | A | A |

TABLE 3-continued

| | Material of Phase-Change Recording Layer (in atomic mass) | | | | PI Error of DOW10 Recording (x: double speed) | | | | | | Jitter Property of DOW10 Recording (x: double speed) | | | | | |
|---|---|---|---|---|---|---|---|---|---|---|---|---|---|---|---|---|
| | Sb | Sn | Ge | Ga | 3.3x | 4x | 5x | 6x | 7x | 8x | 3.3x | 4x | 5x | 6x | 7x | 8x |
| Example 59 | 0.74 | 0.14 | 0.07 | 0.05 | A | A | B | B | A | A | A | A | A | A | A | A |
| Example 60 | 0.54 | 0.24 | 0.13 | 0.09 | A | A | A | A | A | A | A | A | A | A | B | C |
| Example 61 | 0.55 | 0.23 | 0.13 | 0.09 | A | A | A | A | A | A | A | A | A | A | A | B |
| Example 62 | 0.57 | 0.26 | 0.10 | 0.07 | A | A | A | A | A | A | C | B | A | A | A | A |
| Example 63 | 0.58 | 0.25 | 0.10 | 0.07 | A | A | A | A | A | A | B | A | A | A | A | A |
| Example 64 | 0.67 | 0.14 | 0.12 | 0.07 | A | A | A | A | A | A | A | A | A | A | C | C |
| Example 65 | 0.68 | 0.15 | 0.12 | 0.07 | A | A | A | A | A | A | A | A | A | A | B | B |
| Example 66 | 0.59 | 0.19 | 0.10 | 0.12 | A | A | B | B | A | A | A | A | B | B | B | C |
| Example 67 | 0.59 | 0.19 | 0.11 | 0.11 | A | A | A | A | A | A | A | A | B | B | B | B |
| Example 68 | 0.65 | 0.21 | 0.12 | 0.02 | A | A | A | A | A | A | A | B | B | B | B | B |
| Example 69 | 0.65 | 0.21 | 0.11 | 0.03 | A | A | A | A | A | A | A | A | B | B | B | B |
| Example 70 | 0.58 | 0.19 | 0.16 | 0.07 | A | A | A | A | A | A | A | A | B | C | C | C |
| Example 71 | 0.58 | 0.19 | 0.15 | 0.08 | A | A | A | A | A | A | A | A | B | B | B | B |
| Example 72 | 0.67 | 0.21 | 0.04 | 0.08 | A | A | B | B | A | A | B | B | B | A | A | A |
| Example 73 | 0.67 | 0.21 | 0.05 | 0.07 | A | A | A | A | A | A | A | A | A | A | A | A |

From the results shown in Table 3, it was concluded that by employing composition of the Examples, performing a high-speed recording and pursuing appropriate PI error and jitter properties simultaneously in a wide range of linear velocity are possible. It also turns out that the composition range defined for SbSnGaGe is preferable.

Examples 74 to 83

The phase-change optical discs were produced and evaluated similarly to Example 1 except for using the material shown in Table 4 for the material of the second protective layer in the disc of Example 72, altering its film-forming condition to sputtering power of 1.0 kW and film-forming rate of 1.0 nm/sec to 2.5 nm/sec and omitting the formation of sulfidation prevention layer.

Results are shown in Table 4. The evaluation standards of PI error and jitter properties are the same as in Table 1. In addition, data of Example 72 is shown for comparison.

From the results shown in Table 4, it was concluded that by employing composition of the Examples, performing a high-speed recording and pursuing appropriate PI error and jitter properties simultaneously in a wide range of linear velocity are possible.

Examples 84 to 93

The phase-change optical discs were produced and evaluated similarly to Example 1 except for using the material shown in Table 5 for the material of the second protective layer in the disc of Example 72 and forming a layer of 4 nm thickness under film-forming condition at sputtering power of 1.0 kW and film-forming rate of 1.0 nm/sec to 2.5 nm/sec and adjusting the thickness of the first protective layer to be 56 nm.

Results are shown in Table 5. The evaluation standards of PI error and jitter properties are the same as in Table 1. In addition, data of Example 72 is shown for comparison.

TABLE 4

| | Material of Second Protective Layer | PI Error DOW10 Recording (x: double speed) | | | | | | Jitter Property of DOW10 Recording (x: double speed) | | | | | |
|---|---|---|---|---|---|---|---|---|---|---|---|---|---|
| | | 3.3x | 4x | 5x | 6x | 7x | 8x | 3.3x | 4x | 5x | 6x | 7x | 8x |
| Example 72 | ZnS (80 mol %) SiO$_2$ (20 mol %) | A | A | B | B | A | A | B | B | B | A | A | A |
| Example 74 | GeO$_2$:Ge (50 atomic %) | A | A | A | A | A | A | A | A | A | A | A | A |
| Example 75 | GeO$_2$:Si (50 atomic %) | A | A | A | A | A | A | A | A | A | A | A | A |
| Example 76 | GeO$_2$:C (50 atomic %) | A | A | A | A | A | A | A | A | A | A | A | A |
| Example 77 | SiO$_2$:Ge (50 atomic %) | A | A | A | A | A | A | A | A | A | A | A | A |
| Example 78 | SiO$_2$:Si (50 atomic %) | A | A | A | A | A | A | A | A | A | A | A | A |
| Example 79 | SiO$_2$:C (50 atomic %) | A | A | A | A | A | A | A | A | A | A | A | A |
| Example 80 | GeN:Ge (50 atomic %) | A | A | A | A | A | A | A | A | A | A | A | A |
| Example 81 | SiN:Ge (50 atomic %) | A | A | A | A | A | A | A | A | A | A | A | A |
| Example 82 | SiC:Ge (50 atomic %) | A | A | A | A | A | A | A | A | A | A | A | A |
| Example 83 | ZnS:Ge (50 atomic %) | A | A | A | A | A | A | A | A | A | A | A | A |

TABLE 5

| | Material of Second Protective Layer | PI Error DOW10 Recording (x: double speed) | | | | | | Jitter Property of DOW10 Recording (x: double speed) | | | | | |
|---|---|---|---|---|---|---|---|---|---|---|---|---|---|
| | | 3.3× | 4× | 5× | 6× | 7× | 8× | 3.3× | 4× | 5× | 6× | 7× | 8× |
| Example 72 | ZnS (80 mol %) SiO$_2$ (20 mol %) | A | A | B | B | A | A | B | B | B | A | A | A |
| Example 84 | GeO$_2$:Ge (50 atomic %) | A | A | A | A | A | A | A | A | A | A | A | A |
| Example 85 | GeO$_2$:Si (50 atomic %) | A | A | A | A | A | A | A | A | A | A | A | A |
| Example 86 | GeO$_2$:C (50 atomic %) | A | A | A | A | A | A | A | A | A | A | A | A |
| Example 87 | SiO$_2$:Ge (50 atomic %) | A | A | A | A | A | A | A | A | A | A | A | A |
| Example 88 | SiO$_2$:Si (50 atomic %) | A | A | A | A | A | A | A | A | A | A | A | A |
| Example 89 | SiO$_2$:C (50 atomic %) | A | A | A | A | A | A | A | A | A | A | A | A |
| Example 90 | GeN:Ge (50 atomic %) | A | A | A | A | A | A | A | A | A | A | A | A |
| Example 91 | SiN:Ge (50 atomic %) | A | A | A | A | A | A | A | A | A | A | A | A |
| Example 92 | SiC:Ge (50 atomic %) | A | A | A | A | A | A | A | A | A | A | A | A |
| Example 93 | ZnS:Ge (50 atomic %) | A | A | A | A | A | A | A | A | A | A | A | A |

From the results shown in Table 5, it was concluded that by employing composition of the Examples, performing a high-speed recording and pursuing appropriate PI error and jitter properties simultaneously in a wide range of linear velocity are possible. In addition, when various compounds as described above are used instead of oxides, nitrides, carbides and sulfides used for the Examples, the results would be similar to that of the Examples.

What is claimed is:

1. A phase-change optical recording medium comprising:
   a substrate, and
   at least a recording layer consisting of a phase-change material disposed on the substrate,
   wherein the phase-change material is expressed by the following Equation 1

$$Sb_\alpha Z_\beta Q_\delta \quad \text{Equation 1}$$

where
   Z represents Sn and one of Sn doped with at least one additive element selected from Bi, Pb and O;
   Q represents C;
   α, β and δ each represents an atomic ratio;
   $0.50 \leq \alpha \leq 0.79$;
   $0.10 \leq \beta \leq 0.30$; and
   $0.03 \leq \delta \leq 0.25$,
   wherein a maximum recording linear velocity $V_H$ of the phase-change optical recording medium is 20 m/s to 60 m/s,
   wherein a range of linear velocity of the phase-change optical recording medium recordable even when the recording linear velocity is continuously changed is $0.3V_H$ to $1.0V_H$, and
   wherein jitter is less than 12% and reproduction error is 350 or less when 10 repeated recordings are performed.

2. The phase-change optical recording medium according to claim 1, wherein the recording layer is amorphousized for recording of information and crystallized for erasing of information by irradiating a laser beam.

3. The phase-change optical recording medium according to claim 1, wherein a minimum length of the recorded mark of the phase-change optical recording medium is 0.5 μm or less.

4. The phase-change optical recording medium according to claim 1, wherein the phase-change optical recording medium is a rewritable DVD disc recordable at a linear velocity of 3.3 double speeds to 8 double speeds and PI error is 350 or less.

5. The phase-change optical recording medium according to claim 4, wherein a recording of the phase-change optical recording medium at a linear velocity of 4 double speeds to 6 double speeds is possible and PI error is 350 or less.

6. The phase-change optical recording medium according to claim 4, wherein the rewritable DVD disc is one of DVD-RW and DVD+RW.

7. The phase-change optical recording medium according to claim 1, wherein the loading of the additive element when "Z" comprises Sn and the additive element is less than 0.05 in atomic ratio.

8. The phase-change optical recording medium according to claim 1, wherein at least a first protective layer, the recording layer, a second protective layer and a reflective layer are disposed on the substrate in this sequence, and wherein at least one of the first protective layer and the second protective layer comprises at least one element selected from C, Si and Ge.

9. The phase-change optical recording medium according to claim 8, wherein at least one of the first protective layer and the second protective layer comprises an oxide, nitride, sulfide, carbide or a mixture thereof having at least one element selected from C, Si and Ge as an elementary substance.

* * * * *